United States Patent
Takahashi

(10) Patent No.: US 10,254,480 B2
(45) Date of Patent: Apr. 9, 2019

(54) OPTICAL SPLITTER CIRCUIT

(71) Applicant: NEC Corporation, Minato-ku, Tokyo (JP)

(72) Inventor: Morio Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/080,724

(22) PCT Filed: Jan. 23, 2017

(86) PCT No.: PCT/JP2017/002123
§ 371 (c)(1),
(2) Date: Aug. 29, 2018

(87) PCT Pub. No.: WO2017/159044
PCT Pub. Date: Sep. 21, 2017

(65) Prior Publication Data
US 2019/0011636 A1  Jan. 10, 2019

(30) Foreign Application Priority Data
Mar. 14, 2016 (JP) .................. 2016-049409

(51) Int. Cl.
*G02B 6/122* (2006.01)
*G02B 6/12* (2006.01)

(52) U.S. Cl.
CPC .... *G02B 6/1228* (2013.01); *G02B 2006/1215* (2013.01); *G02B 2006/12159* (2013.01); *G02B 2006/12164* (2013.01)

(58) Field of Classification Search
CPC ................. G02B 6/128; G02B 6/1225; G02B 2006/12164
See application file for complete search history.

(56) References Cited

U.S. PATENT DOCUMENTS

2005/0058386 A1  3/2005  Little
2011/0129236 A1  6/2011  Jeong
2012/0002921 A1*  1/2012  Jeong ..................... G02B 6/125 385/32
2015/0117867 A1  4/2015  Sugiyama

FOREIGN PATENT DOCUMENTS

| JP | 2002-286952 A | 10/2002 |
| JP | 2011-118055 A | 6/2011 |
| JP | 2012-013886 A | 1/2012 |
| WO | 2014/016940 A1 | 1/2014 |

OTHER PUBLICATIONS

International Search Report for PCT Application No. PCT/JP2017/002123, dated Apr. 25, 2017.

* cited by examiner

*Primary Examiner* — Sung H Pak
*Assistant Examiner* — Hoang Q Tran

(57) ABSTRACT

Provided is an optical splitter circuit capable of solving a problem that stability of an optical splitting ratio is low. An optical splitter 201 splits an input light beam. Arm waveguides 202 and 203 each have a width that decreases in a direction in which a light beam propagates and a tapered structure that propagates the light beam split by the optical splitter 201. Taper angles of these tapered structures differ from each other. The optical multiplexer 204 multiplexes the light beams from the arm waveguides 202 and 203 and then outputs them.

7 Claims, 2 Drawing Sheets

OPTICAL SPLITTER CIRCUIT

This application is a National Stage Entry of PCT/JP2017/002123 filed on Jan. 23, 2017, which claims priority from Japanese Patent Application 2016-049409 filed on Mar. 14, 2016, the contents of all of which are incorporated herein by reference, in their entirety.

TECHNICAL FIELD

The present invention relates to an optical splitter circuit. In particular, the present invention relates to an asymmetric Mach-Zehnder interferometer optical splitter circuit.

BACKGROUND ART

In the asymmetric Mach-Zehnder interferometer optical splitter circuit, a light beam is split and the split light beams are input to each of two arm waveguides, and the light beams from the respective arm waveguides are combined, then split, and then then output to two output waveguides. An optical splitting ratio, which is a ratio of the intensity of the light beams output to the respective output waveguides, changes according to a phase difference between the light beams from the respective arm waveguides. Thus, in order to obtain a desired optical splitting ratio, the phase difference between the light beams needs to be set appropriately.

As a method for setting the phase difference between the light beams, it is common to use a curved waveguide as at least one of the arm waveguides and change a geometric length along which the light beam propagates, so that an optical path length difference between the light beams from the respective arm waveguides is changed to thereby set the phase difference between the light beams. However, the optical path length difference between the light beams propagating through the curved waveguides is affected not only by the geometric lengths of the curved waveguides but also by the state of light confinement and an offset of a part connecting the curved waveguides. Therefore, there has been a problem in this method that the optical splitting ratio is unstable such that the light splitting ratio becomes wavelength dependent and polarization dependent.

In order to solve this problem, Patent Literature 1 discloses an optical splitter circuit using a tapered waveguide having a tapered structure instead of a curved waveguide as an arm waveguide. In this optical splitter circuit, a width-decreasing tapered waveguide, in which the width thereof gradually decreases, is used for one of the two arm waveguides, and a width-expanding tapered waveguide, in which the width thereof gradually expands, is used for the other. The optical path length of the light beam propagating through the tapered waveguide changes according to the effective refractive index determined from a taper angle and a width of the tapered waveguide. Thus, in this optical splitter circuit, the optical path length difference between the light beams propagating through the two arm waveguides can be adjusted by changing the effective refractive index of the arm waveguide without changing the geometric length along which the light beam propagates by means of a curved waveguide.

CITATION LIST

Patent Literature

Patent Literature 1: Japanese Unexamined Patent Application Publication No. 2011-118055

SUMMARY OF INVENTION

Technical Problem

For example, when light beams to be input to the arm waveguides are formed by 2×2 (2 inputs and 2 outputs) MMI (Multi Mode Interference Waveguide), the light beams propagating through the arm waveguides include not only light beams in a fundamental mode but also a small number of light beams in a higher-order mode. For this reason, the light beams propagating through the arm waveguides meander due to the influence of the light beams in the higher-order mode. As a result, the optical path length of the light beam propagating through the arm waveguide becomes unstable, possibly causing the optical splitting ratio to differ from a desired value and to become wavelength dependent.

Therefore, the arm waveguide needs the function of a mode filter for removing the light beams in the higher-order mode. The width-decreasing tapered waveguide having a certain length can function as a mode filter. However, the width-expanding tapered waveguide cannot be expected to function as a mode filter.

In the optical splitter circuit described in Patent Literature 1, one of the arm waveguides is a width-expanding tapered waveguide. Thus, the light beams in the higher-order mode remain. Therefore, the optical splitter circuit described in Patent Literature 1 has a problem that the stability of the optical splitting ratio is low.

An object of the present invention is to provide an optical splitter circuit capable of solving the above problem that the stability of the optical splitting ratio is low.

Solution to Problem

An optical splitter circuit according to the present invention includes two waveguides, an optical splitter, and an optical combiner. The two waveguides each includes: a tapered waveguide having a tapered structure with a width decreasing in a direction in which a light beam propagates; an inverse tapered waveguide having an inverse tapered structure with a width expanding in the direction in which the light beam propagates. Taper angles of the taper structures of the two waveguides differ from each other. One of the waveguides having the tapered waveguide with the taper angle larger than that of the tapered waveguide of another one of the waveguides includes a linear waveguide that optically connects the tapered waveguide to the inverse tapered waveguide. Widths of an input end and an output end of the tapered waveguide in the one of the waveguides are equal to widths of an input end and an output end of the other one of the waveguides, respectively. Widths of an input end and an output end of the inverse tapered waveguide in the one of the waveguides are equal to widths of an input end and an output end of the other one of the waveguides, respectively. The optical splitter is configured to split an input light beam and outputs split light beams to the respective waveguides, respectively. The optical combiner is configured to combine the light beams from the respective waveguides and then split a combined light beam.

Advantageous Effects of Invention

The present invention can improve the stability of the optical splitting ratio.

DESCRIPTION OF EMBODIMENTS

Figure 1:
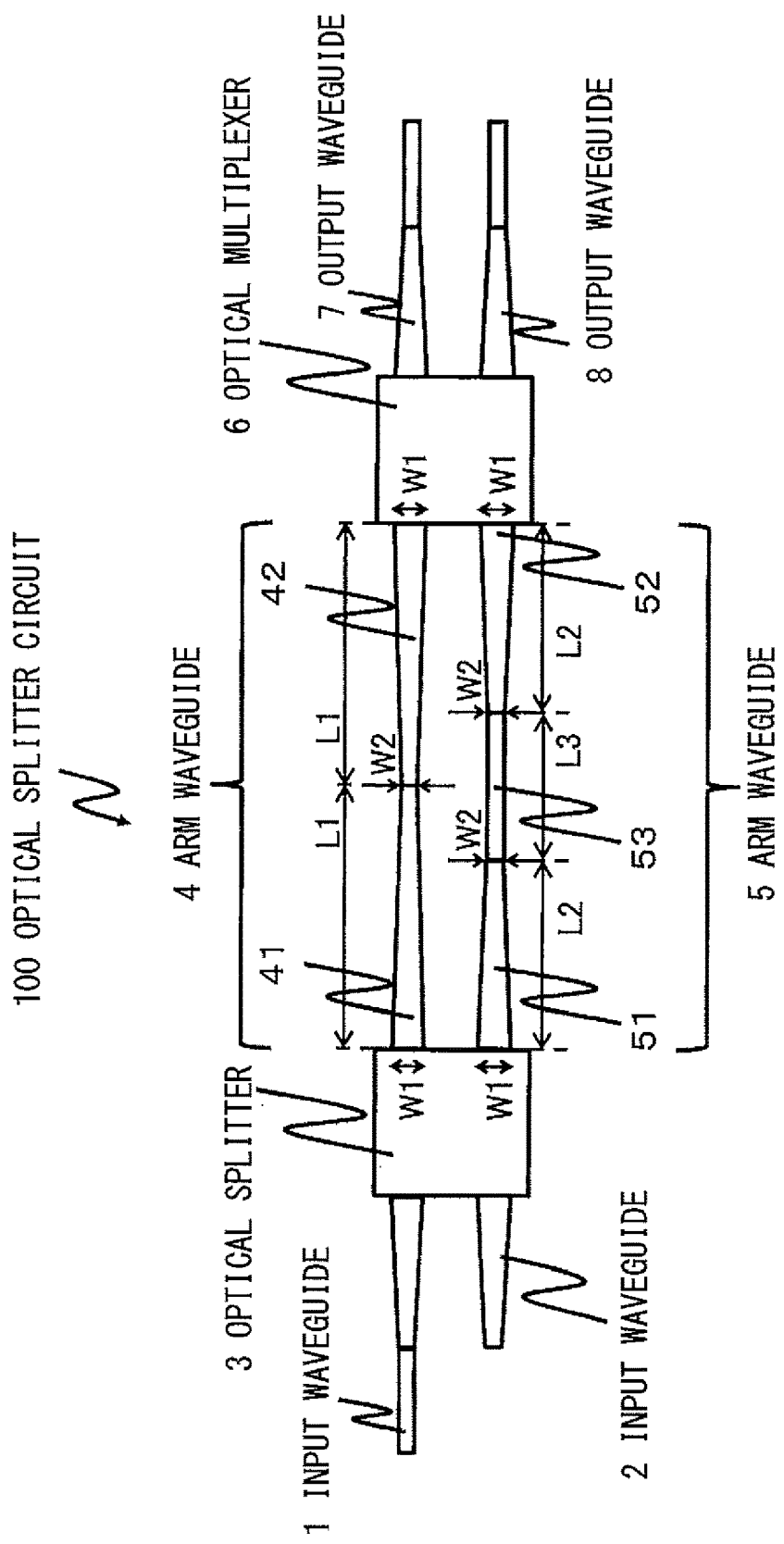
FIG. 1 is a configuration diagram schematically showing a configuration of an optical splitter circuit according to a first embodiment of the present invention.

Hereinafter, embodiments of the present invention will be described with reference to the drawings. In the drawings, the components having the same functions are denoted by the same reference signs, and the description thereof may be omitted.

FIG. 1 is a configuration diagram schematically showing a configuration of an optical splitter circuit according to a first embodiment of the present invention. An optical splitter circuit 100 shown in FIG. 1 includes input waveguides 1 and 2, an optical splitter 3, arm waveguides 4 and 5, an optical multiplexer 6, and output waveguides 7 and 8.

The input waveguides 1 and 2 propagate light beams to be input to the optical splitter 3. The widths of the input waveguides 1 and 2 change in a direction in which light beams propagate. Specifically, each of the input waveguides 1 and 2 are an inverse tapered waveguide that has a width-expanding tapered structure in which a width thereof expands in the direction in which the light beams propagate. Note that the width-expanding tapered structure is sometimes referred to an inverse tapered structure The optical splitter 3 splits the input light beam into two and outputs the split light beams to the arm waveguides 4 and 5, respectively. In the example of FIG. 1, the optical splitter 3 is 2×2 (2 inputs and 2 outputs) optical combining and splitting waveguide (specifically, 2×2 MMI). The optical splitter 3 combines the light beams input from the input waveguides 1 and 2, then splits the combined light beam, and then outputs the split light beams to the arm waveguides 4 and 5, respectively. In this case, an optical phase difference given by the optical splitter 3 to the light beams input to the arm waveguides 4 and 5 is 90 degrees.

Note that the optical splitter 3 may have a configuration different from that of the 2×2 MMI. For example, a 1×2 MMI or a Y-splitter waveguide may be used as the optical splitter 3. In this case, the optical phase difference between the light beams input to the arm waveguides 4 and 5 that is given by the optical splitter 3 is 0 degree.

The arm waveguides 4 and 5 propagate the respective two light beams split by the optical splitter 3. The waveguide lengths, which are the geometrical lengths of the arm waveguides 4 and 5, are equal to each other. The light beams propagating through the arm waveguides 4 and 5 are input to the optical multiplexer 6.

The optical multiplexer 6 is an optical combiner that combines the light beams from the respective arm waveguides 4 and 5 and then splits the combined light beam. In the example of FIG. 1, the optical multiplexer 6 is a 2×2 optical combining and splitting waveguide (specifically, a 2×2 MMI). The optical multiplexer 6 is connected to the two output waveguides 7 and 8, and outputs the split light beams to the output waveguides 7 and 8, respectively. Note that the optical multiplexer 6 may have a configuration different from the 2×2 MMI.

The output waveguides 7 and 8 propagate the light beams from the optical multiplexer 6. The widths of the output waveguides 7 and 8 change in the direction in which the light beams propagate. Specifically, each of the output waveguides 7 and 8 are a tapered waveguide having a width-decreasing tapered structure in which the width thereof decreases in the direction in which the light beams propagate. Note that the width-decreasing tapered structure is sometimes simply referred to as a tapered structure.

Hereinafter, the shapes of the arm waveguides 4 and 5 will be described in more detail.

As shown in FIG. 1, when a 2×2 MMI is used as the optical splitter 3, the light beams input to each of the arm waveguides 4 and 5 include not only the light beams in the fundamental mode but also a small number of light beams in the higher-order mode. Thus, when the light beams in the higher-order mode are not removed, the light beam propagating through each of the arm waveguides 4 and 5 meanders, and the optical path lengths of these light beams become unstable. This could cause the optical splitting ratio, which is the ratio of the intensity of the light beams output to the output waveguides 7 and 8, to differ from a desired value and wavelength dependency to occur in the optical splitting ratio. Therefore, in this embodiment, at least a part of the arm waveguides 4 and 5 has a width-decreasing tapered structure, in which the widths of the arm waveguides 4 and 5 decrease in the direction in which the light beams propagate in order to remove the light beams in the higher-order mode. Taper angles of the tapered structures of the arm waveguides 4 and 5 differ from each other in order to impart an optical path length difference to the light beams propagating through the arm waveguides 4 and 5. In this embodiment, the tapered structure is a linear tapered structure with a fixed angle of a side surface.

Specifically, the arm waveguide 4 includes a tapered waveguide 41 having a width-decreasing tapered structure and an inverse tapered waveguide 42 having a width-expanding tapered structure. The inverse tapered waveguide 42 is disposed in such a way that it is optically directly connected to the downstream tapered waveguide 41. Thus, the inverse tapered waveguide 42 propagates the light beam from the tapered waveguide 41.

In the tapered waveguide 41, a width of an input end to which the light beam is input is W1, a width of an output end from which light beam is output is W2, and a waveguide length, which is a geometrical length, is L1. Here, W1>W2 is satisfied. It is desirable that the width W1 of the input end be greater than an upper limit satisfying a single mode condition, and the width W2 of the output end be equal to or less than half of the upper limit satisfying the single mode condition. Note that the single mode condition is a condition in which only light beams in the fundamental mode propagate through the waveguide.

In the inverse tapered waveguide 42, a width of an input end is W2, a width of an output end is W1, and a waveguide length is L1. Accordingly, the tapered waveguide 41 and the inverse tapered waveguide 42 are disposed in directions opposite to each other, but the shapes thereof are the same. Thus, a magnitude (absolute value) of the taper angle of the inverse tapered waveguide 42 is the same as a magnitude of the taper angle of the tapered waveguide 41.

Further, the arm waveguide 5 includes a tapered waveguide 51 having a width-decreasing tapered structure, an inverse tapered waveguide 52 having a width-expanding tapered structure, and a linear waveguide 53 that optically connects the tapered waveguide 51 to the inverse tapered waveguide 52. Here, the inverse tapered waveguide 52 is disposed to be connected to the downstream tapered waveguide 51 in such a way that it is connected to the tapered waveguide 51 with the linear waveguide 53 interposed therebetween. Thus, the inverse tapered waveguide 52 propagates the light beam from the tapered waveguide 51.

In the tapered waveguide 51, a width of an input end is W1, a width of an output end is W2, and a waveguide length is L2. Here, L1>L2 is satisfied. Therefore, the taper angles of the tapered waveguide 41 and the tapered waveguide 51 differ from each other. Specifically, the taper angle of the tapered waveguide 51 is larger than the taper angle of the tapered waveguide 41.

In the inverse tapered waveguide 52, a width of an input end is W2, a width of an output end is W1, and a waveguide length is L2. Accordingly, the tapered waveguide 51 and the inverse tapered waveguide 52 are disposed in directions opposite to each other, but the shapes thereof are the same. Thus, a magnitude of the taper angle of the inverse tapered waveguide 52 is the same as a magnitude of the taper angle of the tapered waveguide 51.

The linear waveguide 53 is a waveguide having a linear shape with an input end and an output end having the width W2. The waveguide length of the linear waveguide 53 is L3. In this embodiment, the waveguide lengths of the arm waveguides 4 and 5 are equal to each other. Thus, the waveguide length L3 of the linear waveguide 53 satisfies L3=2(L1−L2).

With the above structure, the optical path length difference between the light beams propagating through the arm waveguides 4 and 5 is evaluated.

The effective refractive index of the waveguide commonly depends on the width of the waveguide. However, since the tapered waveguide 41 has a linear tapered structure, the effective refractive index at the center of the tapered waveguide 41 in the direction in which the light beams propagate can be defined as an average effective refractive index n_eff_avg of the tapered waveguide 41. Thus, the optical path length of the light beam propagating through the tapered waveguide 41 is calculated as n_eff_avg×L1. Since the inverse tapered waveguide 42 has the same shape as that of the tapered waveguide 41, the optical path length of the light beam in the entire arm waveguide 4 is calculated as 2×n_eff_avg×L1.

The widths of the input end and the output end of the tapered waveguide 51 are equal to the widths of the input end and the output end of the tapered waveguide 41, respectively, and the tapered waveguide 51 has a linear tapered structure like the tapered waveguide 41. Thus, the average effective refractive index of the tapered waveguide 51 is equal to the average effective refractive index n_eff_avg of the tapered waveguide 41. Further, since the inverse tapered waveguide 52 has the same shape as that of the tapered waveguide 51, the optical path lengths of the light beams in the tapered waveguide 51 and the inverse tapered waveguide 52 are calculated as 2×n_eff_avg×L2. Moreover, when the effective refractive index of the linear waveguide 53 is n_eff, the optical path length of the light beam in the linear waveguide 53 is calculated as n_eff×L3=n_eff×2(L1−L2). Thus, the optical path length of the light beam in the entire arm waveguide 5 is calculated as 2×n_eff_avg×L2+n_eff×2(L1−L2).

Therefore, the optical path length difference ΔL, which is the difference between the optical path lengths in the arm waveguides 4 and 5, is calculated as $$\Delta L=2\times n\_eff\_avg\times L1-(2\times n\_eff\_avg\times L2+n\_eff\times 2(L1-L2))=2(L1-L2)(n\_eff\_avg-n\_eff).$$

In the optical splitter circuit 100 described above, the optical splitter 3 combines the light beams from the input waveguides 1 and 2, then splits the combined light beam, and outputs the split light beams to the arm waveguides 4 and 5, respectively. At this time, the optical splitter 3 gives an optical phase difference of 90 degrees to these light beams.

The light beam input to the arm waveguide 4 propagates through the tapered waveguide 41 and the inverse tapered waveguide 42 in this order and is input to the optical multiplexer 6. The light beam input to the arm waveguide 5 propagates through the tapered waveguide 51, the linear waveguide 53, and the inverse tapered waveguide 52 in this order, and is input to the optical multiplexer 6. When the light beam propagates through the tapered waveguide 41 or the tapered waveguide 51, the light beam in the higher-order mode is removed. Further, an optical phase difference Δφ(rad)=2πΔL/λ corresponding to the optical path length difference ΔL is given to the light beams propagated through the arm waveguides 4 and 5.

The optical multiplexer 6 combines the light beams input from the arm waveguides 4 and 5, then splits the combined light beam, and then outputs the split light beams to the output waveguides 7 and 8, respectively. At this time, in the optical multiplexer 6, the optical splitting ratio is determined according to the optical phase difference in the optical splitter 3 and the optical phase difference in the arm waveguides 4 and 5. Thus, a desired splitting ratio can be achieved by adjusting the taper angles of the arm waveguides 4 and 5 (specifically, the waveguide lengths L1 and L2 and the widths of the tapered waveguides 41 and 51) to thereby appropriately set a difference between the effective refractive indices of the arm waveguides 4 and 5. At this time, the waveguide lengths L1 and L2 are adjusted in such a way that each the tapered waveguides 41 and 51 has a minimum length at which the tapered waveguides 41 and 51 function as mode filters. It is desirable that the waveguide lengths L1 and L2 be adjusted in such a way that the waveguide length L3=2 (L1−L2) of the linear waveguide 53 reaches its maximum within the range that satisfies desired design conditions (e.g., the optical splitting ratio, the widths and materials of the tapered waveguides 41 and 51, and the geometrical distance between the optical splitter 3 and the optical multiplexer 6, etc.).

As described above, in this embodiment, the arm waveguide 4 includes the tapered waveguide 41 having a tapered structure in which the width decreases in the direction in which the light beams propagate, and the inverse tapered waveguide 42 having an inverse tapered structure in which the width thereof expands in the direction in which the light beams propagate. Further, the arm waveguide 5 includes the tapered waveguide 51 having a tapered structure and the inverse tapered waveguide 52 having an inverse tapered structure. The taper angles of the tapered structures of the tapered waveguides 41 and 51 differ from each other. The arm waveguide 5 having the tapered waveguide 51 with a taper angle larger than that of the tapered waveguide 41 includes the linear waveguide 53 that optically connects the tapered waveguide 51 to the inverse tapered waveguide 52. The widths of the input end and the output end of the tapered waveguide 41 in the arm waveguide 4 are equal to the width of the input end and the output end of the tapered waveguide 51 in the waveguide 5, respectively. Further, the widths of the input end and the output end of the inverted tapered waveguide 42 in the arm waveguide 4 are equal to the widths of the input end and the output end of the inverse tapered waveguide 52 in the arm waveguide 5, respectively. In this case, since the taper angles of the tapered structures in the arm waveguides 4 and 5 differ from each other, a desired optical splitting ratio can be achieved by adjusting the taper angles to thereby adjust the difference between the effective refractive indices of the arm waveguides 4 and 5 even without adjusting the geometrical lengths of the arm waveguides 4 and 5. As each of the arm waveguides 4 and 5 has a tapered structure in which the width decreases in the direction in which the light beams propagate, the arm waveguides 4 and 5 can be made to function as mode filters for removing the light beams in the higher-order mode. Therefore, the stability of the optical splitting ratio can be improved. Since it is not necessary to use a curved waveguide, the size of the optical splitter circuit 100 can be reduced.

Further, in this embodiment, the size of the optical splitter circuit 100 can be further reduced, because the tapered waveguide 41 and the inverse tapered waveguide 42 are directly connected to each other in the arm waveguide 4.

Next, a second embodiment will be described.

Figure 2:
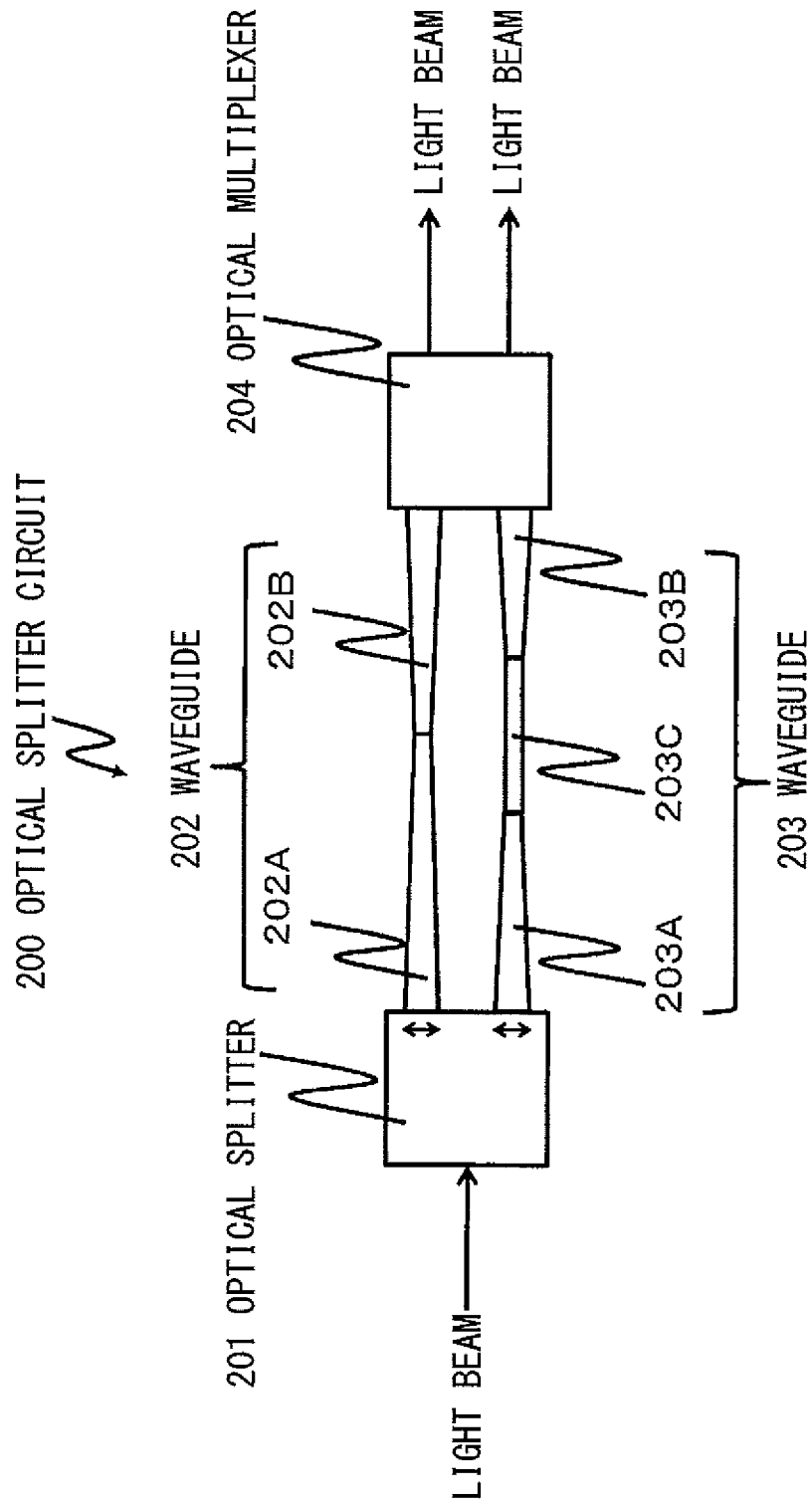
FIG. 2 is a configuration diagram schematically showing a configuration of an optical splitter circuit according to a second embodiment of the present invention.

FIG. 2 is a configuration diagram schematically showing a configuration of an optical splitter circuit according to the second embodiment of the present invention. The optical splitter circuit 200 shown in FIG. 2 includes an optical splitter 201, waveguides 202 and 203, and an optical combiner 204.

The optical splitter 201 splits an input light beam and outputs the split light beams to the waveguides 202 and 203, respectively. The waveguide 202 includes a tapered waveguide 202A having a tapered structure in which a width decreases in a direction in which light beams propagate, and an inverse tapered waveguide 202B having an inverse tapered structure in which a width thereof expands in the direction in which the light beams propagate. Further, the waveguide 203 includes a tapered waveguide 203A having a tapered structure and an inverse tapered waveguide 203B having an inverse tapered structure. The taper angles of the tapered structures of the tapered waveguides 202A and 202B differ from each other. The arm waveguide 203 having the tapered waveguide 203A with a taper angle larger than that of the tapered waveguide 202B includes a linear waveguide 203C that optically connects the tapered waveguide 203A to the inverse tapered waveguide 203B. The widths of the input end and the output end of the tapered waveguide 202A in the arm waveguide 202 are equal to the width of the input end and the output end of the tapered waveguide 203A in the waveguide 203, respectively. Further, the widths of the input end and the output end of the inverted tapered waveguide 202B in the waveguide 202 are equal to the widths of the input end and the output end of the inverse tapered waveguide 203B in the waveguide 3, respectively. The optical combiner 204 combines the light beams from the respective arm waveguides 202 and 203, then splits the combined light beam, and outputs the split light beams.

Like in the first embodiment, in this embodiment, the waveguides 202 and 203 have the tapered structures in which the widths thereof decrease in the direction in which the light beams propagate. The taper angles of these tapered structures different from each other can improve the stability of the optical splitting ratio.

In each of the above-described embodiments, the configurations shown are merely examples, and the present invention is not limited to these configurations.

For example, the tapered structures of the arm waveguides 4 and 5 and the waveguides 202 and 203 may be a parabolic tapered structure, an exponential tapered structure or the like instead of the linear tapered structure.

Although the present invention has been described with reference to the embodiments, the present invention is not limited to the above-described embodiments. Various changes that can be understood by those skilled in the art within the scope of the present invention can be made to the configuration and details of the present invention.

The present application is based upon and claims the benefit of priority from Japanese Patent Application No. 2016-049409, filed on Mar. 14, 2016, the entire contents of which are hereby incorporated by reference.

REFERENCE SIGNS LIST 100, 200 OPTICAL SPLITTER CIRCUIT
1, 2 INPUT WAVEGUIDE
3, 201 OPTICAL SPLITTER
4, 5 ARM WAVEGUIDE
6 MULTIPLEXER
7, 8 OUTPUT WAVEGUIDE
41, 51 TAPERED WAVEGUIDE
42, 52 INVERSE TAPERED WAVEGUIDE
53 LINEAR WAVEGUIDE
202, 203 WAVEGUIDE
204 OPTICAL COMBINER

What is claimed is:

1. An optical splitter circuit comprising:
two waveguides each comprising:
a tapered waveguide having a tapered structure with a width decreasing in a direction in which a light beam propagates; and
an inverse tapered waveguide having an inverse tapered structure with a width expanding in the direction in which the light beam propagates, wherein
taper angles of the tapered structures of the two waveguides differ from each other,
one of the waveguides having the tapered waveguide with the taper angle larger than that of the tapered waveguide of another one of the waveguides comprises a linear waveguide that optically connects the tapered waveguide to the inverse tapered waveguide,
widths of an input end and an output end of the tapered waveguide in the one of the waveguides are equal to widths of an input end and an output end of the other one of the waveguides, respectively, and
widths of an input end and an output end of the inverse tapered waveguide in the one of the waveguides are equal to widths of an input end and an output end of the other one of the waveguides, respectively;
an optical splitter configured to split an input light beam and outputs the split light beams to the waveguides, respectively; and
an optical combiner configured to combine the light beams from the respective waveguides and then split the combined light beam.

2. The optical splitter circuit according to claim 1, wherein, in each of the waveguides, the tapered waveguide and the inverse tapered waveguide have the same magnitude of the taper angles.

3. The optical splitter circuit according to claim 1, wherein, in the other one of the waveguides comprising the tapered waveguide with the taper angle smaller than that of the tapered waveguide of the one of the waveguides, the tapered waveguide is optically directly connected to the inverse tapered waveguide.

4. The optical splitter circuit according to claim 1, wherein in each of the waveguides, the width of the input end of the tapered waveguide is greater than an upper limit value satisfying a single mode condition, and, in each of the waveguides, the width of the output end of the tapered waveguide is less than or equal to half of the upper limit.

5. The optical splitter circuit according to claim 1, wherein the optical splitter and the optical combiner comprises an optical combining and splitting waveguide with two inputs and two outputs.

6. The optical splitter circuit according to claim 1, further comprising an input waveguide configured to output the light beam to the optical splitter and having a width changing in the direction in which the light beam propagates.

7. The optical splitter circuit according to claim 1, further comprising an output waveguide configured to input the light beam split by the optical combiner and having a width changing in the direction in which the light beam propagates.

\* \* \* \* \*